(12) United States Patent
Nakamura et al.

(10) Patent No.: US 7,841,449 B2
(45) Date of Patent: Nov. 30, 2010

(54) LUBRICATION STRUCTURE FOR TRANSMISSION

(75) Inventors: Kazuaki Nakamura, Toyota (JP);
Hiromichi Kimura, Okazaki (JP);
Kazuyuki Watanabe, Anjo (JP);
Terufumi Miyazaki, Toyota (JP);
Daisuke Kusamoto, Nagoya (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 830 days.

(21) Appl. No.: 11/219,755

(22) Filed: Sep. 7, 2005

(65) Prior Publication Data
US 2006/0054410 A1 Mar. 16, 2006

(30) Foreign Application Priority Data
Sep. 16, 2004 (JP) .............................. 2004-270204

(51) Int. Cl.
*F01M 1/18* (2006.01)
*F16H 57/02* (2006.01)
(52) U.S. Cl. ...................... 184/6.4; 184/6.12; 184/6.25; 74/606 R; 74/467; 74/468
(58) Field of Classification Search ................ 184/6.12, 184/6.4, 6.25
See application file for complete search history.

(56) References Cited

U.S. PATENT DOCUMENTS

| | | | | | |
|---|---|---|---|---|---|
| 1,220,810 | A | * | 3/1917 | Alquist | 184/6.12 |
| 1,493,319 | A | * | 5/1924 | Brodie | 74/343 |
| 1,554,081 | A | * | 9/1925 | Garrett | 184/6.12 |
| 1,608,413 | A | * | 11/1926 | Mortensen | 184/11.1 |
| 1,787,428 | A | * | 1/1931 | Fekete et al. | 384/404 |
| 1,870,857 | A | * | 8/1932 | Mathewson | 184/6.14 |
| 2,891,808 | A | * | 6/1959 | Richardson | 277/412 |
| 4,305,627 | A | * | 12/1981 | Yargici | 384/464 |
| 4,630,711 | A | * | 12/1986 | Levrai et al. | 184/6.12 |
| 4,721,184 | A | * | 1/1988 | Sowards | 184/6.12 |
| 5,035,155 | A | * | 7/1991 | Robledo | 74/467 |
| 5,333,704 | A | * | 8/1994 | Hoff | 184/11.4 |
| 6,622,825 | B2 | * | 9/2003 | Iida et al. | 184/6.25 |
| 6,718,847 | B2 | * | 4/2004 | Rimkus et al. | 74/606 R |
| 6,786,042 | B2 | * | 9/2004 | Ishii | 60/487 |
| 2002/0053489 | A1 | * | 5/2002 | Schnitzer | 184/6.12 |
| 2002/0175026 | A1 | * | 11/2002 | Varailhon et al. | 184/6.12 |

FOREIGN PATENT DOCUMENTS

| | | |
|---|---|---|
| JP | 62-27259 | 2/1987 |
| JP | 5-33853 | 2/1993 |
| JP | 5-47601 | 6/1993 |
| JP | 7-280181 | 10/1995 |
| JP | 9-86200 | 3/1997 |
| JP | 2002-221273 | 8/2002 |

* cited by examiner

*Primary Examiner*—Bradley T King
*Assistant Examiner*—Mahbubur Rashid
(74) *Attorney, Agent, or Firm*—Oblon, Spivak, McClelland, Maier & Neustadt, L.L.P.

(57) ABSTRACT

A lubrication structure of a transmission includes a gear chamber having an internal space storing lubricating oil, in which chamber a pressure is raised to a prescribed pressure, a gear chamber having an internal space communicating to the internal space through a communicating hole and attaining a pressure lower than the prescribed pressure, and an oil catch tank provided in the internal space at a position directly under the communicating hole and receiving the lubricating oil that flows into the internal space from the internal space through the communicating hole. With such a structure, a lubrication structure for a transmission capable of holding an oil level at a proper level with a simplified structure can be provided.

9 Claims, 5 Drawing Sheets

TO LEFT DRIVESHAFT ⇐    ⇒ TO RIGHT DRIVESHAFT

LUBRICATION STRUCTURE FOR TRANSMISSION

This nonprovisional application is based on Japanese Patent Application No. 2004-270204 filed with the Japan Patent Office on Sep. 16, 2004, the entire contents of which are hereby incorporated by reference.

FIELD OF THE INVENTION

The present invention relates to a lubrication structure for a transmission, and more particularly to a lubrication structure for a transmission including a gear chamber and an adjacent chamber between which a pressure difference is produced.

DESCRIPTION OF THE BACKGROUND ART

As a conventional technique related to a lubrication structure for a transmission, for example, Japanese Patent Laying-Open No. 05-033853 discloses an oil regulating apparatus preventing increase in friction or air suction by an oil pump caused by oil level change depending on an oil temperature. In the oil regulating apparatus disclosed in this document, a circulation system for an automatic transmission having an oil pan and an oil cooler includes an oil flow distributing portion having a distributing valve. The circulation system for an automatic transmission is connected to a reservoir tank having a return valve via the oil flow distributing portion. When the oil temperature is high, the oil is moved from the oil pan to the reservoir tank by means of the distributing valve. Meanwhile, when the oil temperature is low, the oil is returned from the reservoir tank to the oil pan by means of the return valve.

In addition, Japanese Patent Laying-Open No. 07-280181 discloses a breather apparatus aiming to improve assembly of a transmission and to efficiently recover the oil. The breather apparatus disclosed in this document includes a gear chamber and a coupled chamber communicating to the gear chamber through a communicating hole. The breather apparatus further includes a catch tank connected to the coupled chamber through a breather hose and located opposite to the gear chamber with the coupled chamber being interposed.

In the oil regulating apparatus disclosed in Japanese Patent Laying-Open No. 05-033853, in order to allow drive of the distributing valve based on the oil temperature, an oil temperature sensor for detecting an oil temperature or a controller for properly actuating the distributing valve based on an electric signal output from the oil temperature sensor should be provided. Accordingly, increase in the cost for parts or increase in the number of attachment steps may be caused. In addition, if the oil regulating apparatus is incorporated in a vehicle, such an apparatus is disadvantageous also from the viewpoint of weight of the vehicle.

SUMMARY OF THE INVENTION

The present invention was made to solve the above-described problems. An object of the present invention is to provide a lubrication structure for a transmission capable of holding an oil level at a proper level with a simplified structure.

A lubrication structure for a transmission according to the present invention includes: a gear chamber having a first internal space storing lubricating oil, in which chamber a pressure is raised to a prescribed pressure; an adjacent chamber having a second internal space communicating to the first internal space through a communicating hole and attaining a pressure lower than the prescribed pressure; and an oil catch portion provided in the second internal space at a position directly under the communicating hole and receiving the lubricating oil that flows into the second internal space from the first internal space through the communicating hole.

According to the lubrication structure for a transmission structured as above, the communicating hole is provided so that the lubricating oil, of which oil level is raised in the first internal space due to increase in the pressure in the gear chamber, can flow into the second internal space from the first internal space. Accordingly, blow out of the lubricating oil from the breather provided in the gear chamber (hereinafter, also simply referred to as breather blow) can be prevented. In addition, the lubricating oil that flows into the second internal space is stored in the oil catch portion arranged directly under the communicating hole. Therefore, a problem in the adjacent chamber caused by higher oil level can be prevented. According to the present invention, the communicating hole and the oil catch portion receiving the lubricating oil are simply provided. Therefore, these effects can be achieved with a simplified structure.

In addition, the adjacent chamber contains a gear. According to the lubrication structure for a transmission structured as above, higher oil level in the adjacent chamber is suppressed, so that the gear provided in the adjacent chamber can be prevented from being immersed in the lubricating oil. Accordingly, as the lubricating oil is not stirred by the rotating gear, the temperature of the lubricating oil is stabilized and deterioration of the lubricating oil due to temperature increase can be prevented. Moreover, energy loss caused by stirring of the lubricating oil by the rotating gear can be reduced.

Preferably, the adjacent chamber contains at least one of a differential gear and a counter gear. Here, the differential gear refers to a gear connected to a differential apparatus by bolts or the like and rotating with the differential apparatus as one unit. The counter gear refers to a gear for driving the differential gear. According to the lubrication structure for a transmission structured as above, as the adjacent chamber containing these gears attains a lower pressure, a pressure difference between the first internal space and the second internal space is increased. Accordingly, the lubricating oil in the first internal space can more vigorously be introduced into the second internal space, and occurrence of breather blow can effectively be prevented.

Preferably, the lubricating oil that has flowed from the first internal space spills from the oil catch portion when a prescribed amount is exceeded. According to the lubrication structure for a transmission structured as above, the lubricating oil that has exceeded the prescribed amount can be moved to the adjacent chamber, without separately providing an oil path in the oil catch portion. Therefore, a lubrication structure system can be simplified.

Preferably, the oil catch portion has an opening for draining the lubricating oil. According to the lubrication structure for a transmission structured as above, the lubricating oil is not kept in such a state as being stored in the oil catch portion. Therefore, when there is no longer a pressure difference between the gear chamber and the adjacent chamber, the oil level of the lubricating oil can return to a proper level before a pressure difference is produced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

An embodiment of the present invention will be described with reference to the drawings.

First Embodiment

Figure 1:
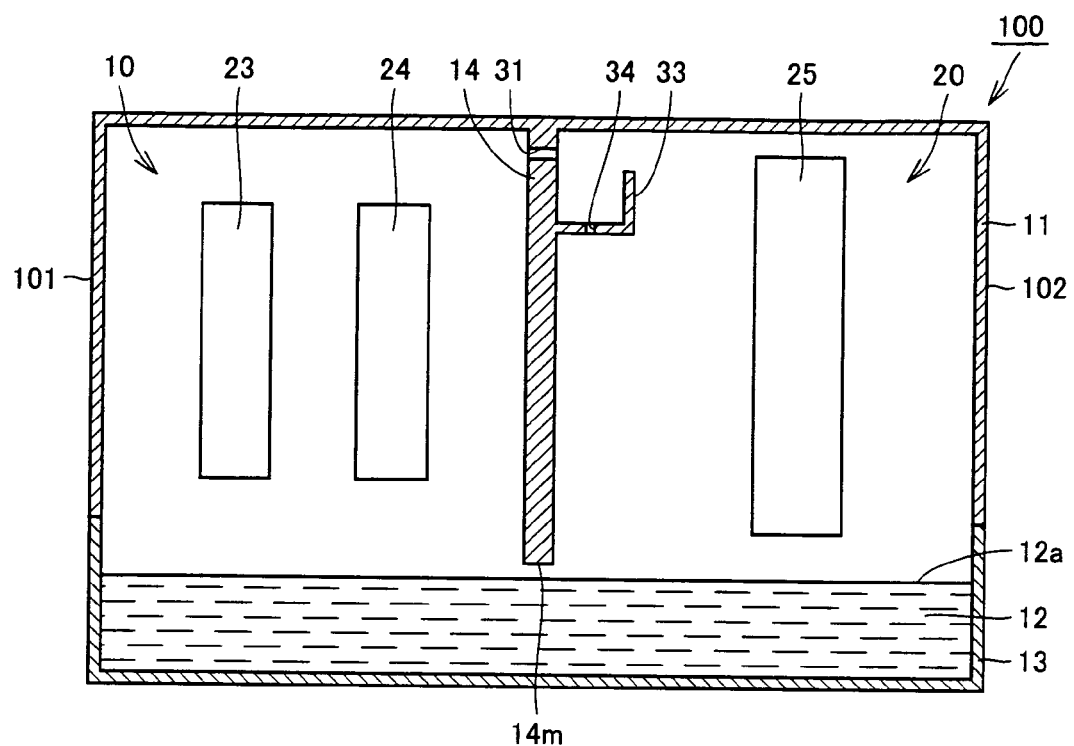
FIG. 1 is a cross-sectional view of a lubrication structure for a transmission in a first embodiment of the present invention.

FIG. 1 shows a state in which a transmission mounted on a vehicle is not actuated. Referring to FIG. 1, a transmission 100 includes an oil pan 13 storing lubricating oil 12 and a case 11 assembled to oil pan 13 from above and implementing gear chambers 101 and 102 arranged side by side. In gear chamber 101 and gear chamber 102, internal spaces 10 and 20 are formed respectively. Internal space 10 and internal space 20 are separated from each other by a partition wall 14 provided in case 11. Partition wall 14 extends in a vertically downward direction from a top surface side of case 11, and has an end portion 14m at its tip end, at a distance from a bottom surface of oil pan 13.

In case 11, gears 23 and 24 located in internal space 10 and rotating at a relatively high speed are provided, and a gear 25 located in internal space 20 and rotating at a relatively low speed is provided. Gears 23 to 25 are rotatably supported in case 11.

An oil surface 12a of lubricating oil 12 extends at a level not in contact with end portion 14m. That is, in the state shown in FIG. 1 where transmission 100 is not actuated, internal space 10 and internal space 20 communicate to each other through a space between end portion 14m and oil surface 12a. Oil surface 12a is set to a level at which lubricating oil 12 does not contact gears 23 to 25. On partition wall 14, an oil catch tank 33 is provided in internal space 20.

Figure 2:
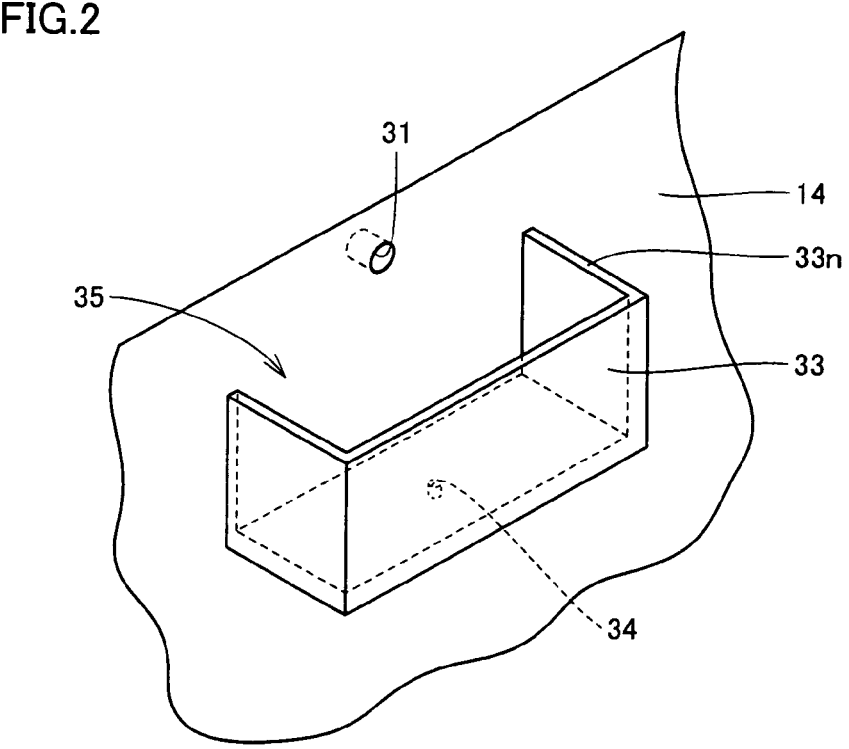
FIG. 2 is a perspective view of a partition wall in the transmission shown in FIG. 1 from a direction of an oil catch tank.

Referring to FIGS. 1 and 2, a communicating hole 31 extending from internal space 10 to internal space 20 is formed in partition wall 14. Communicating hole 31 is formed in the vicinity of the top surface of case 11, and a distance between the top surface of case 11 and communicating hole 31 is smaller than a distance between communicating hole 31 and end portion 14m. Oil catch tank 33 is provided at a position directly under communicating hole 31, that is, in a vertically downward direction from the position of communicating hole 31, at a prescribed distance therefrom. Oil catch tank 33 has an edge portion 33n, and an opening 35 opening vertically upward and surrounded by edge portion 33n is formed. It is noted that the oil catch tank may be implemented by a gutter provided directly under communicating hole 31 and a tank connected thereto.

A through hole 34 is formed in the bottom surface of oil catch tank 33. Through hole 34 is formed to have a diameter smaller than that of communicating hole 31. For example, when communicating hole 31 has a diameter of 10 mm, through hole 34 has a diameter of approximately 1 mm to 1.5 mm. Alternatively, a slit-like opening may be formed in the bottom surface of oil catch tank 33, instead of through hole 34. In this case, an opening area of the slit-like opening is made smaller than that of communicating hole 31.

Figure 3:
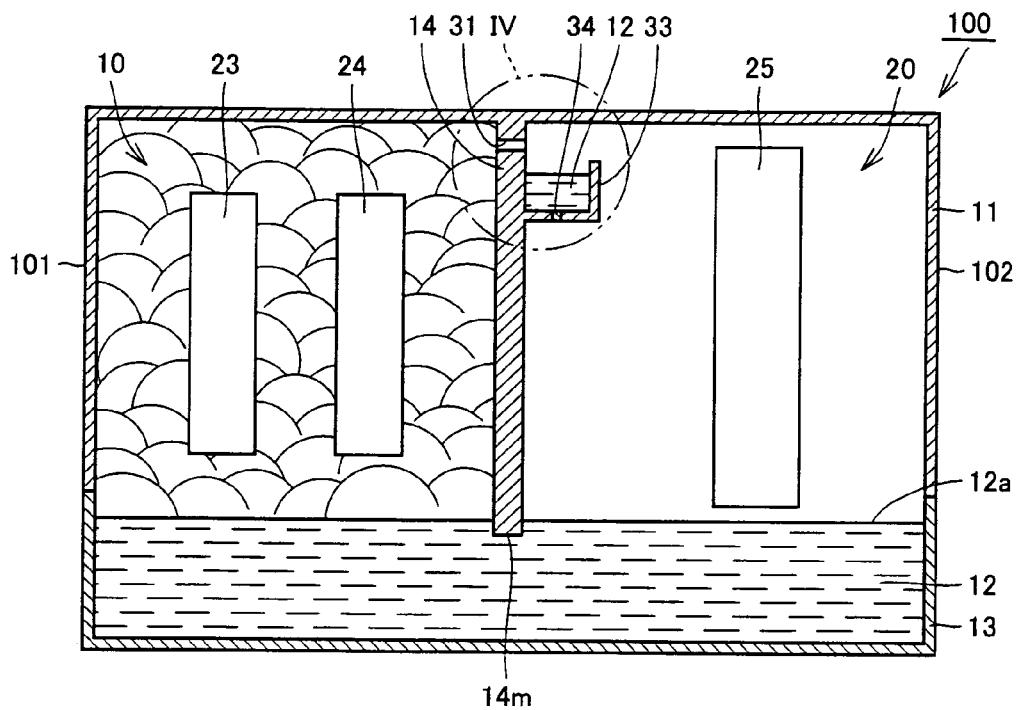
FIG. 3 is a cross-sectional view of a state in which the transmission in FIG. 1 is actuated.

Referring to FIG. 3, when transmission 100 is actuated, lubricating oil 12 is suctioned from oil pan 13 by a not-shown pump, and supplied to each part within the transmission. Thereafter, lubricating oil 12 is returned to oil pan 13. As a result, the temperature of lubricating oil 12 is raised, and oil surface 12a becomes higher due to thermal expansion. In addition, in internal space 10, lubricating oil 12 supplied to gears 23 and 24 is stirred by gears 23 and 24 that rotate at high speed, and turns into a creamy state incorporating air bubbles. The volume of lubricating oil 12 is thus expanded.

As a result, the space between end portion 14m and oil surface 12a disappears, and communication between internal space 10 and internal space 20 is blocked by lubricating oil 12. Here, as the pressure is raised in internal space 10 where gears 23 and 24 rotate at high speed, a pressure difference between internal space 10 and internal space 20 is produced.

Figure 4:
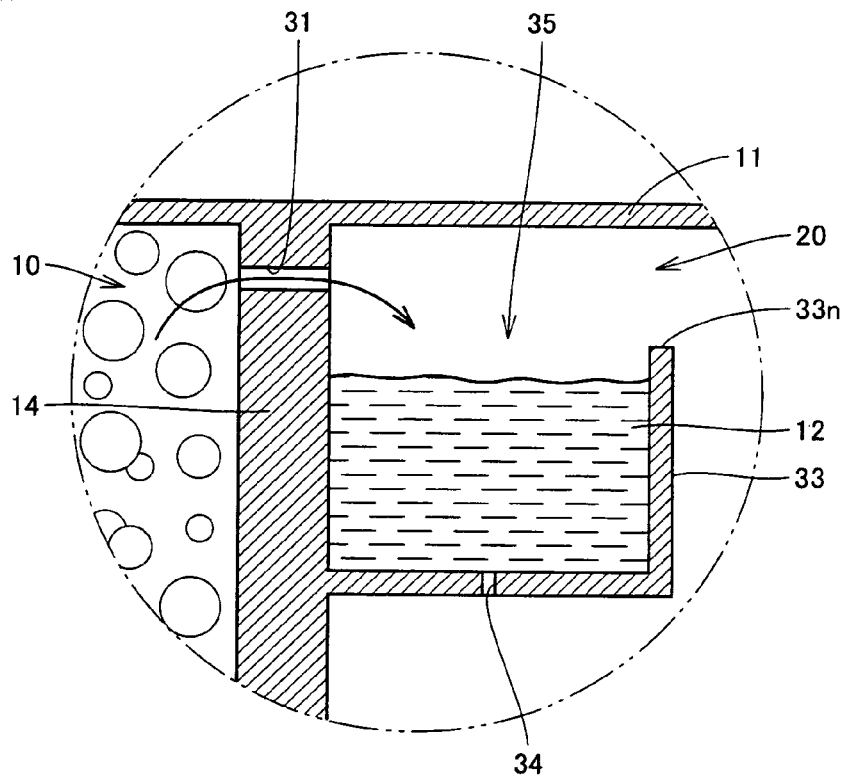
FIG. 4 is an enlarged cross-sectional view of a section encircled with chain-double-dotted line IV in FIG. 3.

Referring to FIGS. 3 and 4, creamy lubricating oil 12 in internal space 10 flows into internal space 20 through communicating hole 31, due to the pressure difference between internal space 10 and internal space 20. Therefore, in the present embodiment, breather blow of lubricating oil 12 can reliably be prevented, regardless of a loaded state of transmission 100.

Lubricating oil 12 that has flowed into internal space 20 flows into oil catch tank 33 provided directly under communicating hole 31. As through hole 34 is formed in the bottom surface of oil catch tank 33, lubricating oil 12 drains through through hole 34 to oil pan 13 within internal space 20. Through hole 34, however, has a diameter smaller than communicating hole 31, and an amount of lubricating oil 12 that drains through through hole 34 is small. Therefore, lubricating oil 12 is accumulated in oil catch tank 33.

Lubricating oil 12 is accumulated in oil catch tank 33, so that oil surface 12a can be kept at a level not in contact with gear 25. Accordingly, energy loss caused by stirring of lubricating oil 12 by gear 25 can be reduced. In addition, as lubricating oil 12 is not stirred by gear 25, the temperature of lubricating oil 12 can be stabilized. In this manner, deterioration of lubricating oil 12 is suppressed and the life thereof can be improved. In addition, when lubricating oil 12 properly works, reliability or durability of transmission 100 can be improved.

After the oil surface of lubricating oil 12 accumulated in oil catch tank 33 reaches edge portion 33n, lubricating oil 12 spills from oil catch tank 33. Spilt lubricating oil 12 falls down to oil pan 13 within internal space 20.

Figure 5:
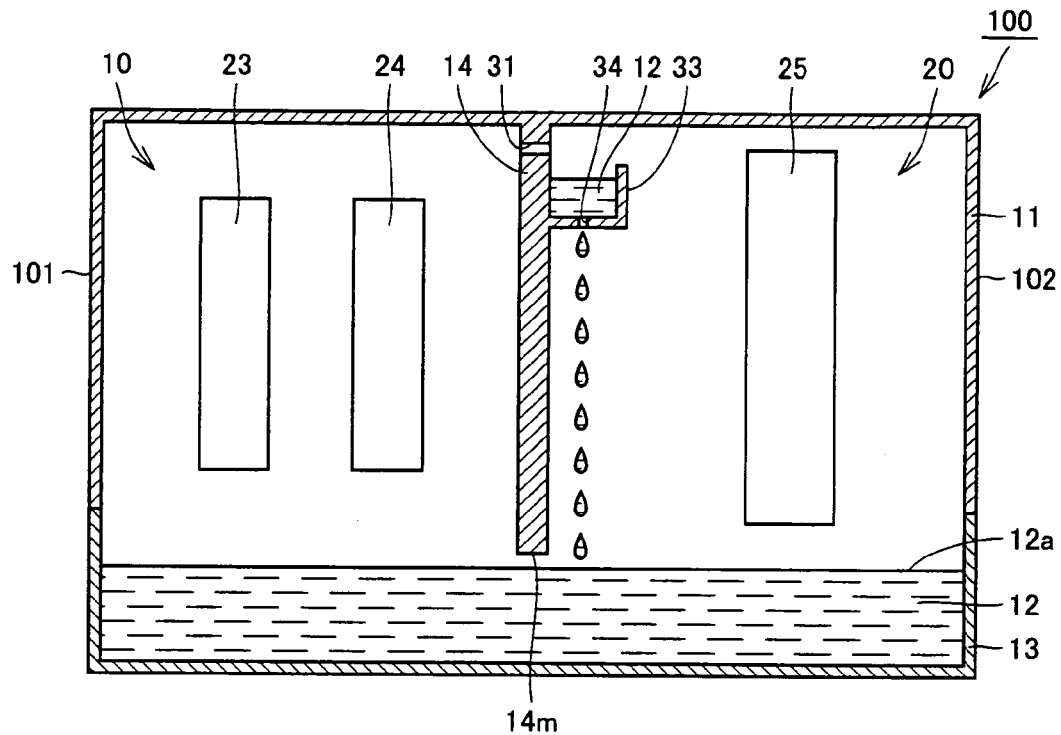
FIG. 5 is a cross-sectional view of a state in which actuation of the transmission in FIG. 3 is stopped.

Referring to FIG. 5, when actuation of transmission 100 is stopped, the temperature of lubricating oil 12 is gradually lowered. With the temperature lowering, oil surface 12a is also lowered. Meanwhile, lubricating oil 12 accumulated in oil catch tank 33 is returned to oil pan 13 within internal space 20 through through hole 34.

Figure 6:
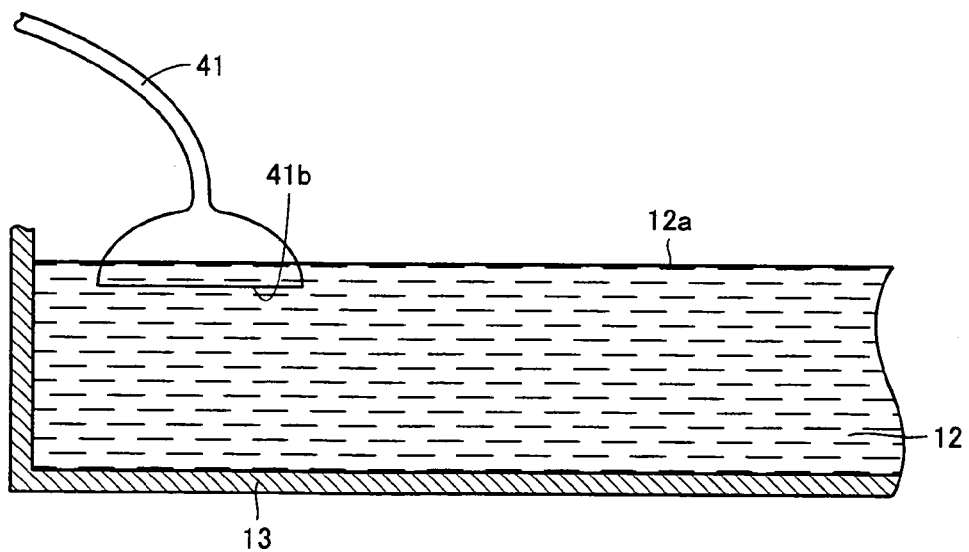
FIG. 6 is an enlarged cross-sectional view of an area around an oil pan in the transmission in FIG. 1.

Referring to FIG. 6, FIG. 6 shows an oil strainer 41 for a pump suctioning lubricating oil 12 from oil pan 13. If oil surface 12a of lubricating oil 12 is lower than a suction port 41b of oil strainer 41, air suction by the pump takes place, in which case lubricating oil 12 cannot be circulated to each part in the transmission. Therefore, before transmission 100 is actuated, oil surface 12a is set to a level higher than suction port 41b.

In the present embodiment, lubricating oil 12 is not kept in such a state as being stored in oil catch tank 33 but returned to oil pan 13. Therefore, even after actuation of transmission 100 is stopped, oil surface 12a can return to its original proper level. Accordingly, air suction by the pump when transmission 100 is actuated again can be prevented.

In addition, if transmission 100 is used in an extremely cold place, lubricating oil 12 may attain a temperature not higher than 0° C. at the time of start of transmission 100. Here, as lubricating oil 12 experiences thermal shrinkage, oil surface 12a is significantly lowered. In the present embodiment, however, there is no possibility of breather blow of lubricating oil 12. Therefore, oil surface 12a can be set to a sufficiently high level at which air suction by the pump does not take place even at a low temperature. In this manner, transmission 100 reliably attaining its function in an extremely cold place and free from occurrence of breather blow even when the vehicle runs at high speed or under high load can be realized.

The lubrication structure for transmission 100 according to the first embodiment of the present invention includes gear chamber 101 having internal space 10 serving as the first internal space storing lubricating oil 12, in which chamber a pressure is raised to a prescribed pressure, gear chamber 102 serving as the adjacent chamber having internal space 20 serving as the second internal space communicating to internal space 10 through communicating hole 31 and attaining a pressure lower than the prescribed pressure, and oil catch tank 33 serving as the oil catch portion provided in internal space 20 at a position directly under communicating hole 31 and receiving lubricating oil 12 that flows into internal space 20 from internal space 10 through communicating hole 31.

The lubrication structure for transmission 100 further includes oil pan 13 communicating between internal space 10 and internal space 20 and storing lubricating oil 12. Oil pan 13 includes oil strainer 41 having suction port 41b and suctioning lubricating oil 12 through suction port 41b. Oil surface 12a of lubricating oil 12 stored in oil pan 13 is present at a level higher than suction port 41b before and after actuation of transmission 100, and present at a level not in contact with gear 25 at the time of actuation of transmission 100.

According to the lubrication structure for transmission 100 in the first embodiment of the present invention structured as above, communicating hole 31 is provided so that occurrence of breather blow of lubricating oil 12 in gear chamber 101 can be prevented. In addition, oil catch tank 33 is provided so that lubricating oil 12 that has flowed into internal space 20 through communicating hole 31 can temporarily be stored. In this manner, oil surface 12a of lubricating oil 12 that has been raised due to thermal expansion during actuation of transmission 100 can be kept at a level not blocking rotation of gear 25. Moreover, as communicating hole 31 and oil catch tank 33 are realized as a simplified structure, these effects can be achieved with low cost.

Second Embodiment

In the present embodiment, an example in which the lubrication structure described in the first embodiment is applied to an automatic transmission mounted on an FF (front engine front wheel drive) vehicle will be described. For understanding of an internal structure of the automatic transmission, FIG. 7 shows different cross-sectional shapes developed in one cross-section.

Figure 7:
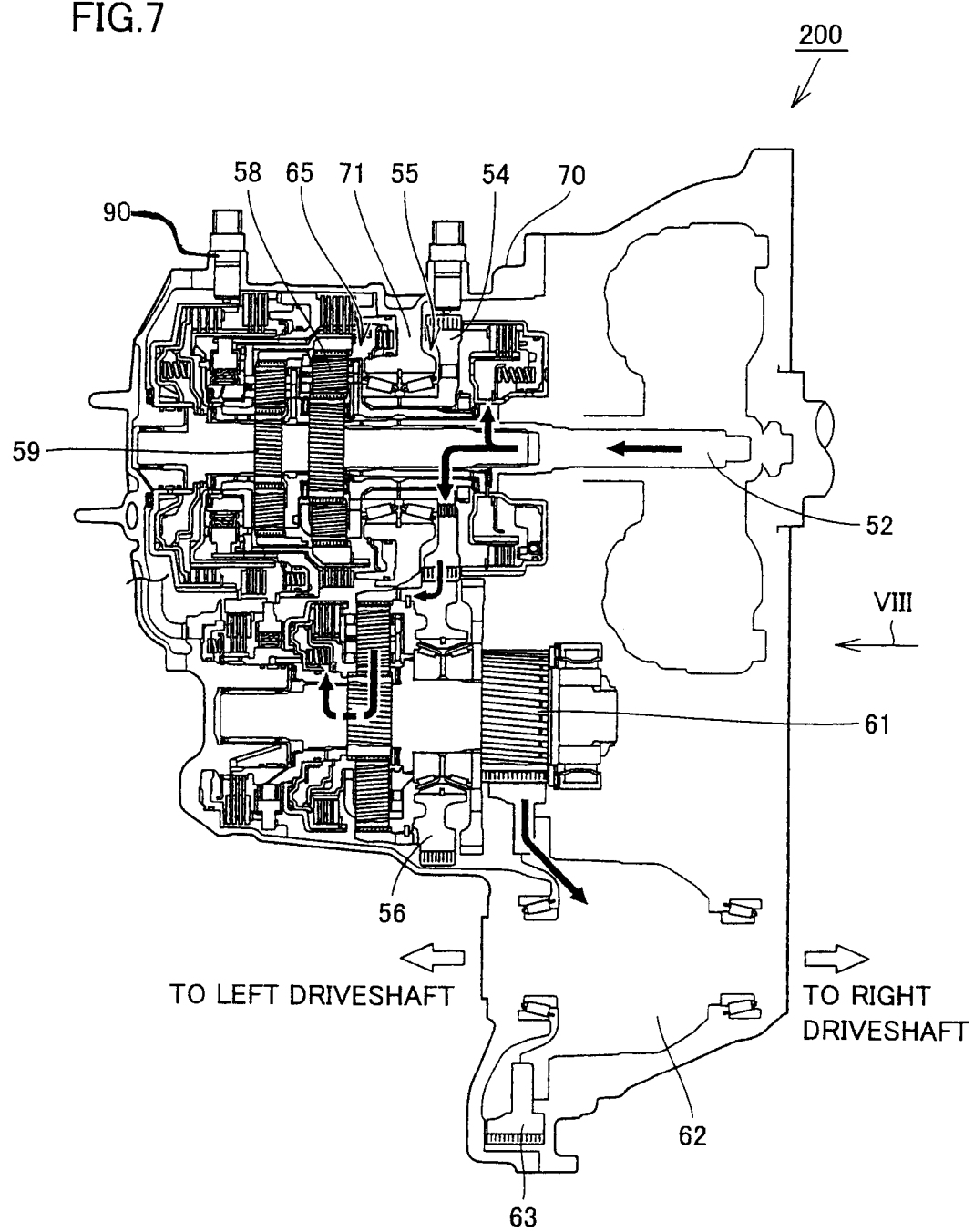
FIG. 7 is a cross-sectional view of a lubrication structure for an automatic transmission in a second embodiment of the present invention.

Referring to FIG. 7, an automatic transmission 200 includes: an input shaft 52 receiving rotational force; a rear planetary gear 59, a front planetary gear 58 and a counter drive gear 54 arranged on an axis of input shaft 52; and a counter driven gear 56 engaged with counter drive gear 54. On an axis where counter driven gear 56 is arranged, a differential drive pinion 61 is provided adjacent to counter driven gear 56. Automatic transmission 200 further includes a differential apparatus 62 having a ring gear 63 engaged with differential drive pinion 61.

These gears included in automatic transmission 200 are accommodated in a case 70. On a bottom surface side of case 70, a not-shown oil pan is attached, and lubricating oil is stored in the oil pan. A partition wall 71 is formed within case 70. A main transmission gear chamber 65 in which rear planetary gear 59, front planetary gear 58 and the like are arranged and a counter gear chamber 55 in which counter drive gear 54, counter driven gear 56 and the like are arranged are formed, in a manner partitioned by partition wall 71. A breather 90 is provided in main transmission gear chamber 65.

Figure 8:
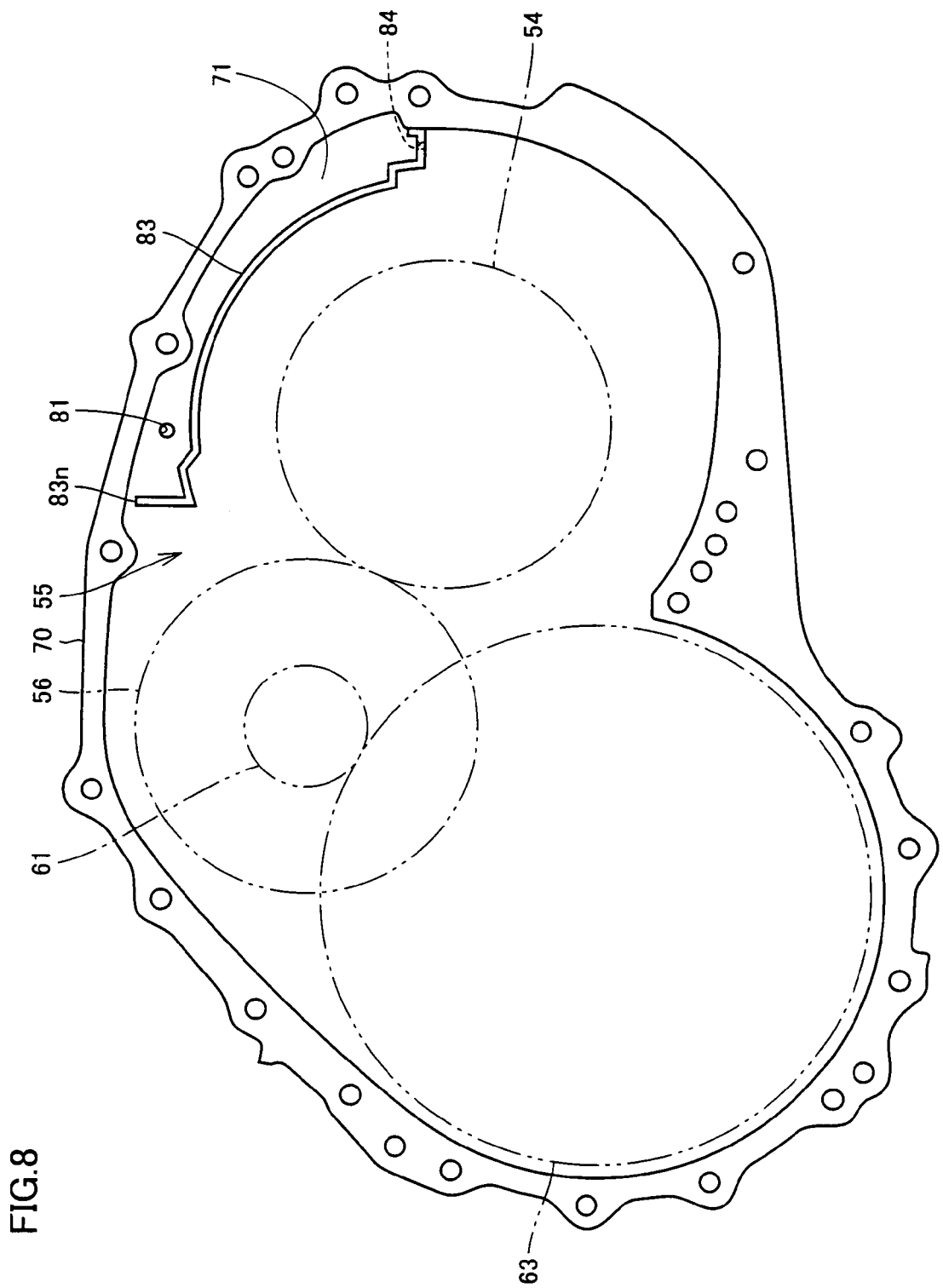
FIG. 8 is a front view of the automatic transmission viewed in a direction of an arrow VIII in FIG. 7.

FIG. 8 shows counter gear chamber 55. Though not shown, main transmission gear chamber 65 is present behind partition wall 71. In partition wall 71, a communicating hole 81 communicating between counter gear chamber 55 and main transmission gear chamber 65 is formed. In addition, on partition wall 71, an oil catch tank 83 is provided within counter gear chamber 55. An upper end portion 83n of oil catch tank 83 is an overflow point at which the lubricating oil accumulated in oil catch tank 83 spills. In a bottom surface of oil catch tank 83, a through hole 84 for draining the lubricating oil is formed.

In the present embodiment, on receiving an input from input shaft 52, rear planetary gear 59 and front planetary gear 58 rotate at high speed. On the other hand, counter drive gear 54 and counter driven gear 56 arranged in counter gear chamber 55 rotate at relatively low speed. As a bearing supporting counter drive gear 54 and counter driven gear 56 is implemented by a simple roller bearing, an amount of the lubricating oil supplied to counter gear chamber 55 is relatively smaller than that supplied to main transmission gear chamber 65. In addition, airtightness of main transmission gear chamber 65 is very high, whereas airtightness of counter gear chamber 55 is not that high.

For these reasons, the pressure within main transmission gear chamber 65 is raised, while a negative pressure lower than atmospheric pressure is attained in counter gear chamber 55. As a result, a pressure difference between main transmission gear chamber 65 and counter gear chamber 55 is produced. The lubricating oil flows into counter gear chamber 55 from main transmission gear chamber 65 through communicating hole 81 as a result of the pressure difference. The lubricating oil that has flowed in is accumulated in oil catch tank 83. When actuation of automatic transmission 200 is stopped, the lubricating oil returns from oil catch tank 83 to the oil pan through through hole 84.

According to the lubrication structure for automatic transmission 200 in the second embodiment of the present invention structured as above, an effect similar to that in the first embodiment can be achieved.

Though the example in which the present invention is applied to an automatic transmission has been described in the present embodiment, the present invention may be applied to a manual transmission or a continuously variable transmission. In addition, a position where a communicating hole is formed is not limited to a position between the main transmission gear chamber and the counter gear chamber, and should only be a position between chambers between which a pressure difference is produced in the transmission. For example, such a position may be a position between a differential chamber, an underdrive chamber, an overdrive chamber, a breather chamber, and the like. The present invention may also be applied to an engine including a gear chamber and an adjacent chamber between which a pressure difference is produced.

As described above, according to the present invention, a lubrication structure for a transmission capable of holding the oil level at a proper level with a simplified structure can be provided.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A lubrication structure for a transmission, comprising:
a case that contains lubricating oil, the case having a partition wall extending downward from a top surface of the case toward a bottom surface that stores the lubricating oil, the partition wall defining a gear chamber and an adjacent chamber, and the partition wall having an end portion which allows stored lubrication oil to freely flow between the gear chamber and the adjacent chamber;
the gear chamber having a first internal space that contains the lubricating oil, wherein a pressure in the gear chamber is increased to a prescribed pressure and the gear chamber includes a breather;
the adjacent chamber having a second internal space communicating to said first internal space through a communicating hole provided in the partition wall at a distance from the end portion, the second internal space attaining a pressure lower than said prescribed pressure; and
an oil catch portion provided in said second internal space at a position directly under said communicating hole, the oil catch portion including a first opening that receives the lubricating oil that flows into said second internal space from said first internal space through said communicating hole and a second opening that allows the lubricating oil to drain from the oil catch portion.

2. The lubrication structure for a transmission according to claim 1, wherein said adjacent chamber contains a gear.

3. The lubrication structure for a transmission according to claim 2, wherein said adjacent chamber contains at least one of a differential gear and a counter gear.

4. The lubrication structure for a transmission according to claim 1, wherein the lubricating oil that has flowed from said first internal space spills from said oil catch portion when a prescribed amount is exceeded.

5. The lubrication structure for a transmission according to claim 1, wherein said second opening that drains the lubricating oil is smaller than said first opening, and wherein said second opening is positioned below said first opening.

6. A lubricating structure according to claim 1, wherein the communicating hole has a diameter of approximately 10 mm.

7. The lubricating structure of claim 5, wherein the second opening in the oil catch portion has a diameter of approximately 1 mm to 1.5 mm.

8. The lubricating structure of claim 1, wherein the second opening has a diameter smaller than a diameter of the communicating hole.

9. The lubricating structure of claim 8, wherein the diameter of the communicating hole is approximately 10 mm and the diameter of the second opening is approximately 1 mm to 1.5 mm.

* * * * *